US011514132B2

(12) United States Patent
Hermann et al.

(10) Patent No.: US 11,514,132 B2
(45) Date of Patent: Nov. 29, 2022

(54) AUTOMATIC WEBSITE DATA MIGRATION

(71) Applicant: Snap Inc., Santa Monica, CA (US)

(72) Inventors: Rodrigo de Proenca Gomes Hermann, Seattle, WA (US); Shijin Liang, Bothell, WA (US)

(73) Assignee: Snap Inc., Santa Monica, CA (US)

( * ) Notice: Subject to any disclaimer, the term of this patent is extended or adjusted under 35 U.S.C. 154(b) by 204 days.

(21) Appl. No.: 16/946,986

(22) Filed: Jul. 14, 2020

(65) Prior Publication Data
US 2022/0019640 A1 Jan. 20, 2022

(51) Int. Cl.
*G06F 16/958* (2019.01)
*G06F 16/21* (2019.01)
*G06F 8/71* (2018.01)
*G06F 16/11* (2019.01)
*G06F 16/16* (2019.01)
*G06F 16/10* (2019.01)
*G06F 16/176* (2019.01)
*G06F 16/13* (2019.01)
*G06F 17/00* (2019.01)

(52) U.S. Cl.
CPC .............. *G06F 16/972* (2019.01); *G06F 8/71* (2013.01); *G06F 16/214* (2019.01); *G06F 16/10* (2019.01); *G06F 16/113* (2019.01); *G06F 16/116* (2019.01); *G06F 16/119* (2019.01); *G06F 16/128* (2019.01); *G06F 16/134* (2019.01); *G06F 16/168* (2019.01); *G06F 16/176* (2019.01); *G06F 16/958* (2019.01)

(58) Field of Classification Search
CPC ........ G06F 16/972; G06F 8/71; G06F 16/214; G06F 16/119; G06F 16/10; G06F 16/113; G06F 16/116; G06F 16/128; G06F 16/134; G06F 16/168; G06F 16/176; G06F 16/958
See application file for complete search history.

(56) References Cited

U.S. PATENT DOCUMENTS 10,311,030 B1 * 6/2019 Barnes ................. G06F 16/214
2004/0225958 A1 * 11/2004 Halpert ................ G06F 16/958
707/E17.116
(Continued)

FOREIGN PATENT DOCUMENTS

CN         105740411 A  *  7/2016

OTHER PUBLICATIONS

English Translation of "CN 105740411 A" (Year: 2016).*
(Continued)

*Primary Examiner* — Quoc A Tran
(74) *Attorney, Agent, or Firm* — Schwegman Lundberg & Woessner, P.A.

(57) ABSTRACT

Aspects of the present disclosure involve systems and methods for performing operations comprising: retrieving, from a content management system (CMS), website generation data that references a data model type stored on the CMS; importing, by a migration agent from the CMS, definition of the data model type referenced by the website generation data as a local version of the data model type; detecting, by the migration agent, a change to a property of the local version of the data model type; and generating, by the migration agent, a migration script to migrate the change to the property of the local version of data model type to the data model type stored on the CMS.

20 Claims, 12 Drawing Sheets

(56) References Cited

U.S. PATENT DOCUMENTS

| | | | |
|---|---|---|---|
| 2011/0179176 A1* | 7/2011 | Ravichandran | H04L 67/02 709/226 |
| 2015/0212989 A1* | 7/2015 | Rice | G06F 16/986 715/234 |
| 2018/0196731 A1 | 7/2018 | Moorthi et al. | |
| 2019/0253485 A1* | 8/2019 | Jyoti Banerjee | G06F 9/5072 |
| 2019/0272387 A1* | 9/2019 | Gkoulalas-Divanis | G06F 21/604 |

OTHER PUBLICATIONS

"International Application Serial No. PCT/US2021/041650, International Search Report dated Nov. 2, 2021", 5 pgs.

"International Application Serial No. PCT/US2021/041650, Written Opinion dated Nov. 2, 2021", 7 pgs.

Adams, Bram, "Modern Release Engineering in a Nutshell—Why Researchers Should Care", IEEE 23rd International Conference on Software Analysis, Evolution, and Reengineering, (2016), 45 pgs.

Chowdhury, Samiul Saki, "An Automated Test Framework for Web-Pages using Git", [Online] Retrieved from the Internet: <URL: https://samiulsaki.info/links/project_05_2017.pdf>, [Retrieved on Sep. 27, 2021], (May 19, 2017), 32 pgs.

Ravula, Shashi, "Achieving Continuous Delivery of Immutable Containerized Microservices with Mesos Marathon", MS Thesis, Aalto University, [Online] Retrieved from the Internet: <URL: https://aaltodoc.aalto.fi/bitstream/handle/123456789/27061/master_Ravula_Shashi_2017.pdf?sequence=1&isAllowed=y>, [Retrieved on Aug. 1, 2017], (May 19, 2017), 84 pgs.

\* cited by examiner

FORFUN.MESSAGE.COM — 910

MEASURE RESULTS THAT MATTER FOR YOUR BUSINESS

CUSTOMIZE YOUR REPORTING AND CREATE SAVED AND SHARED VIEWS FOR QUICK ANALYSIS

CAMPAIGN PERFORMANCE
DELIVERY AND ENGAGEMENT METRICS SUCH AS IMPRESSIONS, SWIPES, INSTALLS, AND MORE.

WEB CONVERSIONS
TRACK CONVERSIONS, BUILD RETARGETING AUDIENCES, AND OPTIMIZE WITH THE SNAP PIXEL.

APP CONVERSIONS
MEASURE APP INSTALLS, APP VISITS AND POST-INSTALL APP WITH ATTRIBUTION AND ANALYTICS TOOLS.

LEARN MORE — 920

FIG. 9

AUTOMATIC WEBSITE DATA MIGRATION

TECHNICAL FIELD

The present disclosure relates generally to website generation and presentation.

BACKGROUND

The popularity of users interacting with other users online continues to grow. There are many ways for users to interact online with other users. Users can communicate with their friends using messaging applications and can play with other users online in multiplayer video games or perform other actions using various other applications. Oftentimes, the main way users communicate with each other and obtain content is via websites.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 9 is an illustrative website generated by the website generation system, in accordance with some examples.

DETAILED DESCRIPTION

Figure 1:
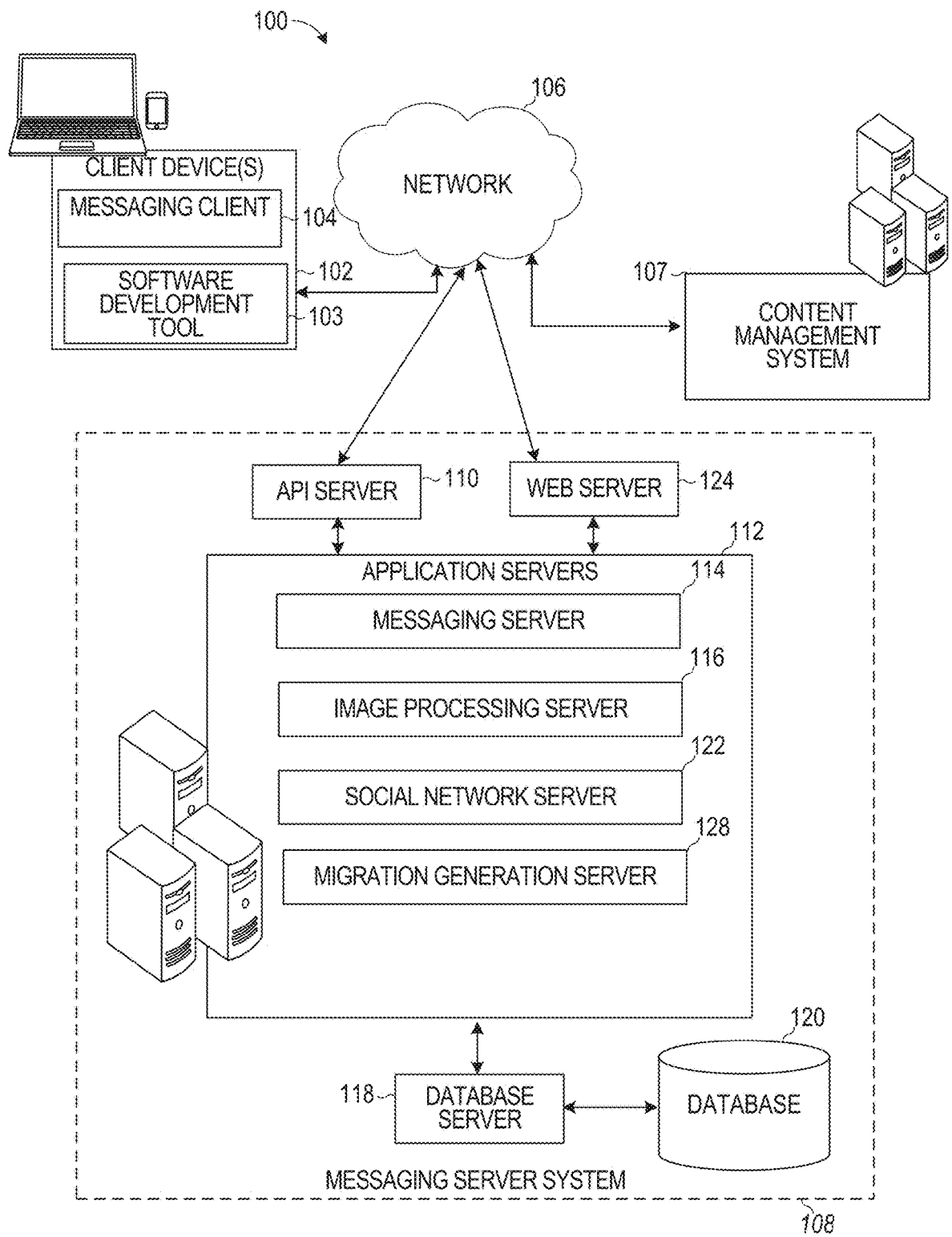
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, website developers generate websites by defining the content on the websites, behavior of elements on the websites and the how the content visually looks on the websites. Namely, website developers not only need to generate the content (such as pictures and text) that is on the website but also need to write code for how the content is presented. Sometimes, the code for defining websites references data model types that are stored in a centralized repository, such as a content management system (CMS). Specifically, the CMS stores code for different data model types and such code can be shared among other websites, typically in the same environment or space on the CMS. In some cases, a website developer may desire to modify the behavior or look associated with a particular data model type. To do so, the website developer has to access the data model type that is stored on the CMS and make the desired changes to the data stored on the CMS. This process takes a great deal of time, adds expense and slows down the speed at which websites can be launched. Also, the website developer is usually limited to defining a website according to the data model types of a particular CMS and cannot easily apply changes to data model types across different CMSs. In order to apply a change to the data model type on a different CMS, the developer has to manually search for and find the appropriate data model type, determine differences and apply the appropriate changes which takes a significant amount of time and effort.

The disclosed embodiments improve the efficiency and speed at which websites are developed and launched using a website generation system. The website generation system automatically migrates changes made to data model types to the data model types stored on one or more CMSs. Specifically, the disclosed website generation system retrieves, from a CMS, website generation data that references a data model type stored on the CMS. The disclosed system imports, by a migration agent in communication with a software development tool, such as GitHub, from the CMS, definition of the data model type referenced by the website generation data as a local version of the data model type. The disclosed system detects, by the migration agent, a change to a property of the local version of the data model type and generates a migration script to automatically migrate the change to the data model type stored on the CMS. In some cases, the disclosed system determines a mapping between data model types defined across different CMSs. In this way, a developer can make changes to the data model type associated with a first CMS and the disclosed system automatically applies the changes to the corresponding data model type of a second CMS. This way, the developer can easily migrate website generation data from one CMS to another without having to specifically identify and make changes to the data model types on each individual CMS. In some cases, a change to the model type on a CMS is detected by the migration agent and reflected in the software development tool. The migration agent or software development tool can then apply that change to another CMS.

The disclosed website generation system further expedites the website development process and reduces the number of resources needed to generate websites. According to the disclosed embodiments, the device resources (e.g., processor cycles, memory, and power usage) needed to accomplish a task with the device are thereby reduced.

Networked Computing Environment

FIG. 1 is a block diagram showing an example messaging system 100 for exchanging data (e.g., messages and associated content) over a network. The messaging system 100 includes multiple instances of a client device 102. The client devices 102 may host a number of applications, including a messaging client 104 and a software development tool 103. Each messaging client 104 is communicatively coupled to other instances of the messaging client 104 and a messaging server system 108 via a network 106 (e.g., the Internet). Messaging server system 108 may include a content management system 107, in which case, each software development tool 103 accesses a website or website generation data from the content management system 107 via the messaging server system 108. In some implementations, all or a portion of the content management system 107 is implemented externally to the messaging server system 108. In these circumstances, each software development tool 103 accesses a website from the content management system 107 directly via the network 106. Although only one content management system (CMS) 107 is shown in FIG. 1, multiple instance of the CMS 107 can be included.

The CMS 107 provides various spaces in which website generation data is stored. Each space shares some code objects within websites stored in the given space. The CMS 107 provides a data model that defines various looks and feels of websites. For example, the data model defines buttons and other graphical elements that can be added to a website. The data model includes multiple data model types and stores code for implementing each data model type. The data model types each include properties and labels. The properties define various attributes of the data model, such as what happens when the button associated with the data model type is selected. In some cases, the data model types can be modified to add, remove or modify the properties of the data model types. Any changes made to the data model type are made available to other website generation data that is stored within the same space or another space to allow the other website generation data to use the modified data model type. The data model types of one CMS 107 may differ from the data model types of another CMS 107. For example, one CMS 107 may define a button data model type without any color properties, while another CMS 107 may also define the button data model type with color properties.

Website generation data can be created and used to reference data model types stored in the CMS 107. By referencing the data model type stored in the CMS 107, the code for generating or including a given data model type, such as a button, on a website need not be written. The software developer simply adds the data model type to the website generation data as a reference to the data model type and when the website generation data is processed to display a webpage, the corresponding code for the data model type is retrieved from the CMS 107 and included in the website generation data that is being requested.

In some embodiments, the software development tool 103 provides a graphical user interface and an application that allows a software developer to write website generation data (e.g., website code). Once the website generation data is written, the website generation data is provided back to the content management system 107 from the software development tool 103. The CMS 107 stores the website generation data at a particular address and when that address is requested by a web browser application, the CMS provides the code corresponding to the website generation data so that the web browser application can present the webpage.

The software development tool 103 allows a software developer to write code using various tools. Some tools include error checking and undo operations. The software development tool 103 tracks changes made to the code in various stages and allows the software developer to test and revert back to previous versions using the undo operations. In some cases, the software development tool 103 includes the GITHUB software development tool. In some cases, the software development tool 103 includes a migration agent that monitors changes being made to data model types (on the software development tool or on the CMS) and migrates those changes to the CMS or another CMS. In some cases, the migration agent is a separate software application that is in communication with the software development tool and monitors for changes being made to the data model type in order to migrate the changes to the model type stored on the CMS.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
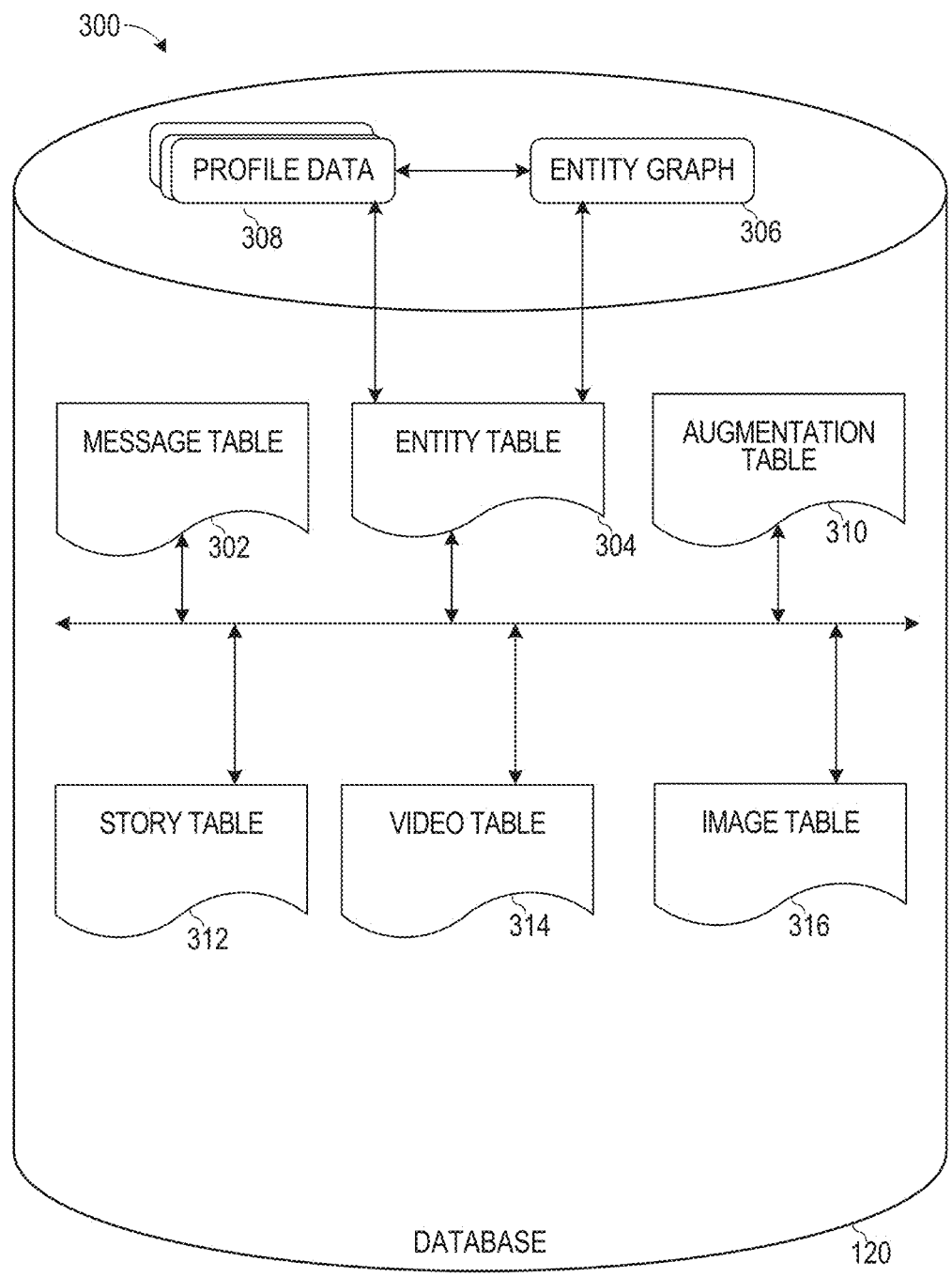
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The migration generation server 128 can be implemented on the application servers 112. Some elements or components of the migration generation server 128 can be included in the software development tool 103 of the client device 102. The migration generation server 128 tracks changes made to data model types (e.g., changes to the properties of the data model type, such as addition of properties, removal of properties, or modifications of existing properties) in the software development tool 103 and automatically migrates those changes to the data model type stored in the CMS 107.

The CMS 107 stores website generation data for various entities. This CMS 107 may be a central repository of website data that is used to present websites. As new websites are created, their respective code (e.g., JSON or XML code) is uploaded and stored on the CMS 107 and references the data model types of the CMS 107 on which they are stored. The content management system 107 provides specifications for how object types (data model types) are defined in website generation data, which is used by developers to generate the content and behavior of websites. Different entities can develop and upload different website generation data that use the same scheme to define object types.

In some embodiments, the software development tool 103 calls an API function associated with the CMS 107 to import or obtain all or a portion of the data model types available from the CMS 107. The imported data model types are stored as a local version of the data model types on the client device 102. A software developer can operate the software development tool 103 to generate website code (website generation data). The local version of the data model types can be modified using the software development tool 103. The migration generation server 128 compares the local version of the data model types to the version of the data model types stored on the CMS 107. The migration generation server 128 automatically generates a script to migrate any differences from the local version of the data model types to the version of the data model types stored on the CMS 107. For example, the software developer can add a new property to a given data model type by changing the local version of the data model type. The migration generation server 128 detects this change or difference between the local version of the given data model type and the data model type that is stored on the CMS 107. In this case, the migration generation server 128 determines that a new property has been added. The migration generation server 128 uses an API of the CMS 107 to automatically write a migration script to add the new property to the version of the given data model type that is stored on the CMS 107.

The migration generation server 128, prior to modifying the version of the data model type that is stored on the CMS 107, verifies that the modification is backwards compatible. For example, the migration generation server 128 generates a demo version of the data model type with the modification made to the local version of the data model type. The migration generation server 128 runs the demo version that does not utilize the added or modified property of the data model type to determine whether the demo version runs successfully. If no errors are detected, the migration generation server 128 allows the migration and modifies the version of the data model type that is stored on the CMS 107. If an error is detected, the migration generation server 128 notifies the user of the software development tool 103 about the error to allow the user to correct the error.

In this way, because various website generation data references the same data model types, the migration generation server 128 verifies that the changes made to the shared data model types will not generate errors in other website generation data that references the same data model type. For example, a first website generation data can reference a first data model type (e.g., a button) and a second website generation data also references the same first data model type. Both the first and second website generation data may be stored in the same space on the CMS 107. A software developer or user can modify the first website generation data using the software development tool 103 to add a new property to the first data model type. The first website generation data uses the new property in the code. This new property is not used by the second website generation data. Because the second website generation data references the same first data model type without the new property, prior to modifying the shared first data model type, a verification is performed to ensure that the addition of the new property does not adversely impact or create errors when the second website generation data accesses the modified first data model type. As such, the migration generation server 128 verifies that the changes made to the data model type are backwards compatible with website generation data that does not use the modified properties of the data model type and that reference the same data model type in the CMS 107 before applying the changes to the properties of the data model type on the CMS 107.

In some implementations, the migration generation server 128 reverts changes back to a previous version of the data model type when a software developer or user selects an undo operation in the software development tool 103. The software development tool 103 tracks changes made to the website generation data periodically or continuously. When a user selects an undo operation, a particular change to the properties of the data model type (e.g., the addition of a new property) are undone (e.g., the newly added property is removed). This way, the software development tool 103 allows a user to access previous versions of the software code and the data model types as the code is being written. The migration generation server 128 similarly detects such changes to the data model type and applies or migrates such changes to the corresponding data model type that is stored on the CMS 107.

System Architecture

Figure 2:
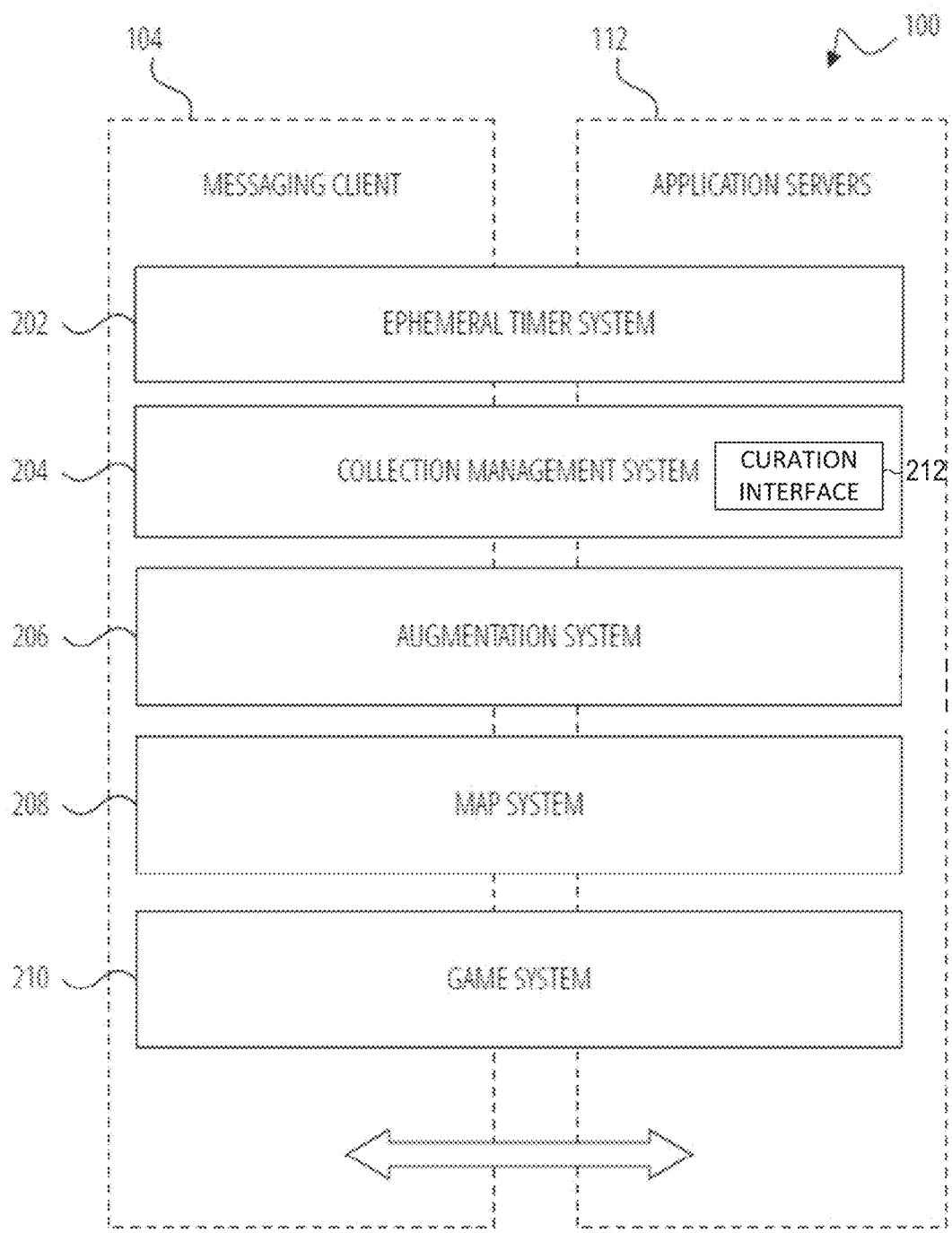
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization), interested-based, or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
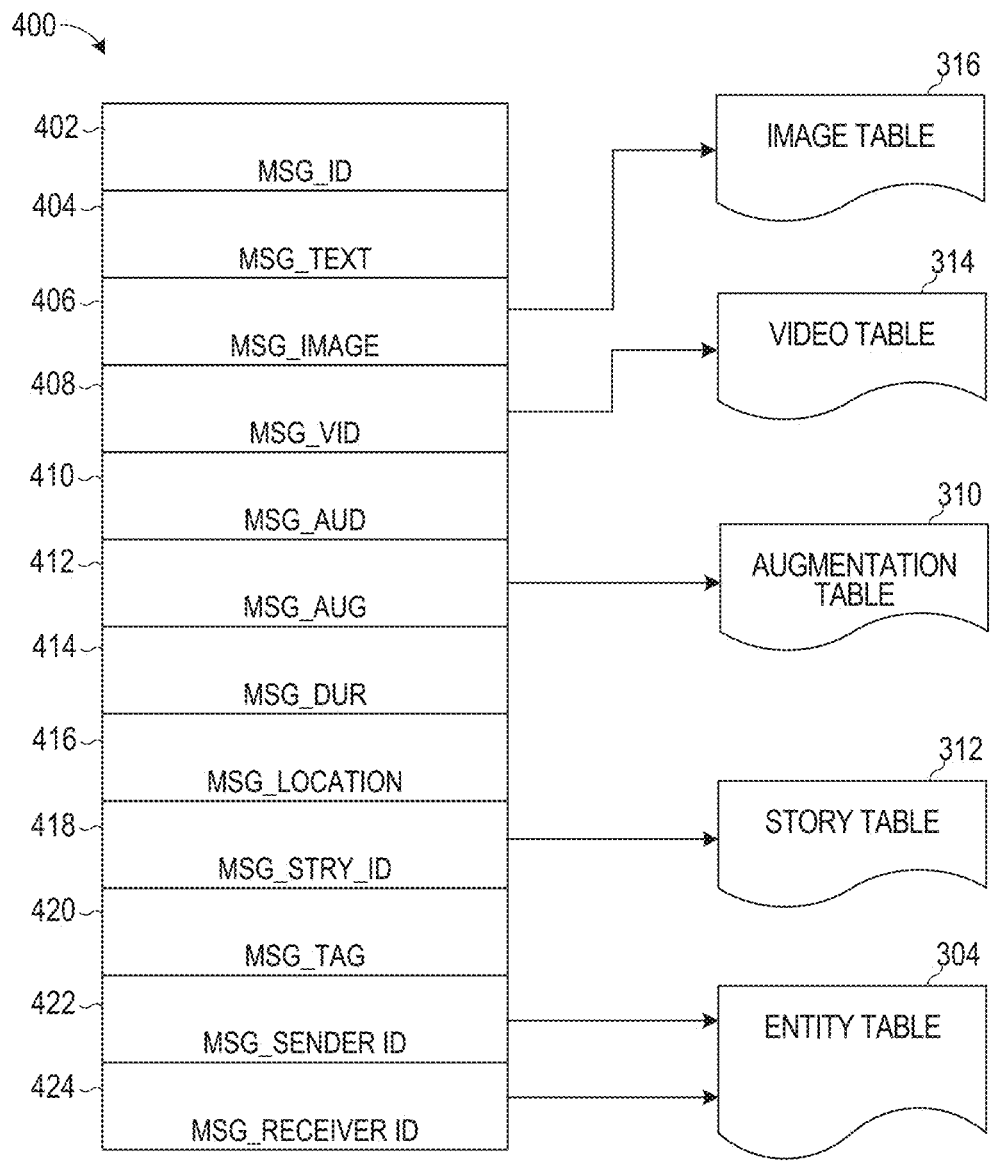
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Website Generation System

Figure 5:
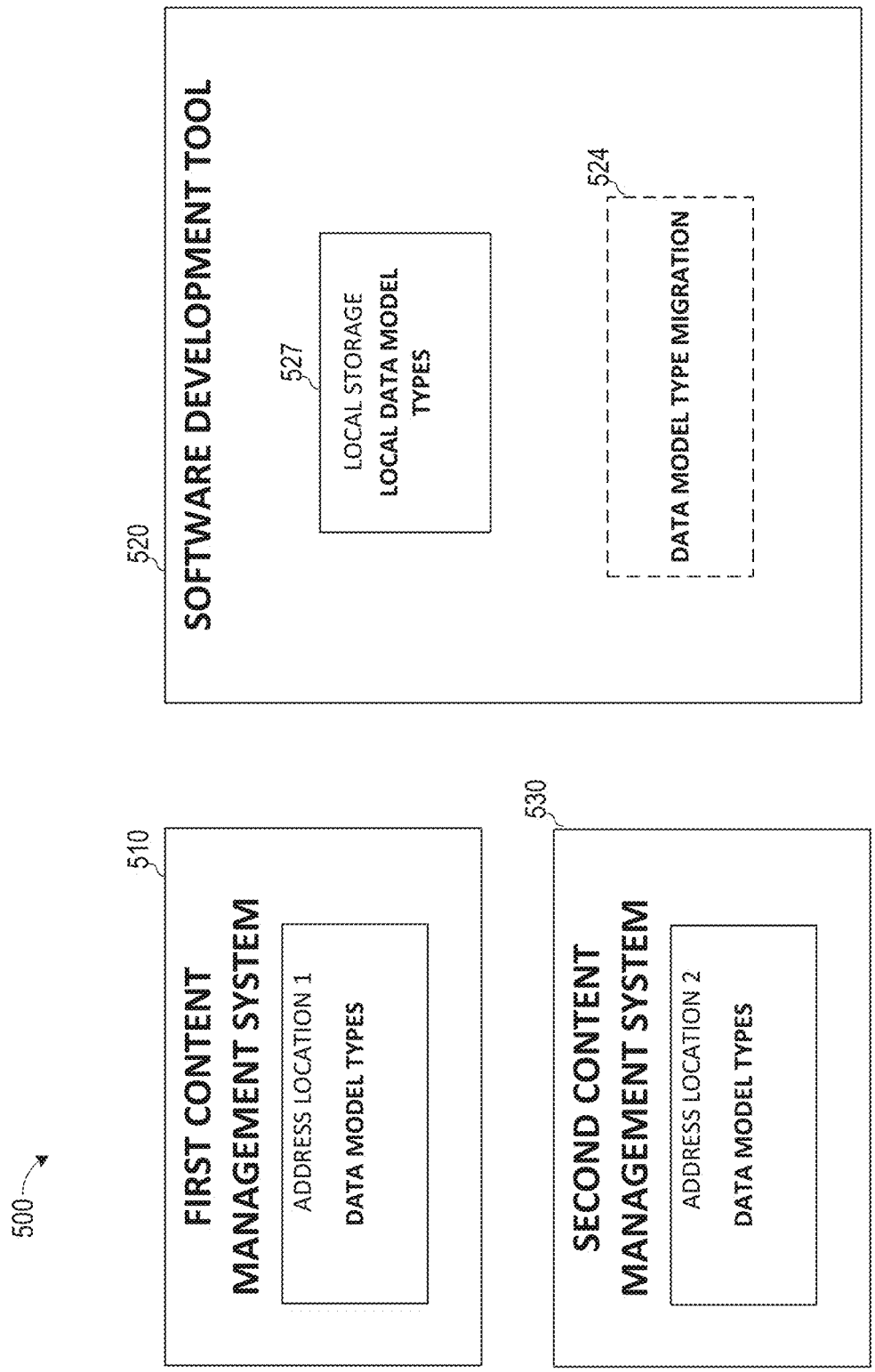
FIG. 5 is a diagrammatic representation of a website generation system, in accordance with some examples.

FIG. 5 is a diagrammatic representation of a website generation system 500, in accordance with some examples. The software development tool 520 may be the same as the software development tool 103 implemented on the client device 102. The software development tool 520 (or migration agent that is in communication with the software development tool 520) uses an API of the first CMS 510 to obtain a local version of the data model types stored and provided by the first CMS 510. The software development tool 520 also obtains the website generation data from a particular space on the first CMS 510. The software development tool 520 stores the local version of the data model types 527 along with the obtained website generation data. In some cases, the software development tool 520 (or the migration agent) only retrieves from the first CMS 510 the data model types that are referenced and used by the obtained website generation data. In such cases, the software development tool 520 obtains the website generation data and parses through the website generation data to identify a list of data model types used and referenced by the website generation data. Then, the software development tool 520 uses the API of the first CMS 510 to obtain the code corresponding to the list of data model types used and referenced by the website generation data. Any function discussed with respect to the software development tool 103 or 520 for migrating data model types from the software development tool to the CMS 510 can be alternatively or in addition performed by the migration agent that is part of or separate from the software development tool 103 or 520.

Figure 6:
FIG. 6 is an illustrative user interface of a software development tool, in accordance with some examples.

A software developer may access the website generation data using the software development tool 520 and make modifications to the website generation data to create a website using the software development tool 520. An illustrative screenshot 610 of the graphical user interface provided by the software development tool 520 is provided in FIG. 6. The software development tool 520 includes various tools and options for writing website generation data or code. Such tools include color coding different segments of the website generation data, including segments corresponding to data model types that are referenced and stored by the first CMS 510. The tools also include undo operations that allow a software developer to undo a limited set or unlimited set of changes to revert back to previous versions of the code.

In some implementations, the software developer may change a given data model type. The software developer may access the local data model types that are stored on the client device 102 and may add, change, or remove properties from a particular local data model type that is accessed. The data model type migration agent 524 continuously or periodically monitors for and detects changes to the data model types stored in the local data model types 527. As an example, the data model type migration agent 524 continuously or periodically compares the data model types stored in the local data model types 527 to the corresponding data model types stored in the first CMS 510. In response to detecting a change or a difference between the data model types, the data model type migration agent 524 generates a script using the API of the first CMS 510 to apply or migrate the changes to the data model types stored on the first CMS 510. This way, when the software development tool commits the changes and uploads the updated website generation data to the first CMS 510, the data model type with the changes that is referenced by the updated website generation data is already available and stored on the first CMS 510.

In some embodiments, the data model type migration agent 524 runs or generates a demo version that references the updated data model types before applying the changes to the corresponding data model type stored on the first CMS 510. The demo version verifies that the changes made to the data model type are backwards compatible with other website generation data that does not use the modified properties of the data model type. If the changes do not create errors, the data model type migration agent 524 updates using the API of the first CMS 510, the corresponding data model type that is stored on the first CMS 510. If an error is identified in the demo version, the data model type migration agent 524 displays the error to the user of the software development tool and does not update the data model type stored in the first CMS 510 with the changes made to the local corresponding data model type.

In some embodiments, the software developer or user may desire to store and apply the modified website generation data on a second CMS 530. The second CMS 530 may include a different set of data model types than the first CMS 520. The second CMS 530 may include a common set of data model types as the first CMS 520 but some of the data model types may include different properties between the first CMS 520 and the second CMS 530. The data model type migration agent 524 receives an instruction to store the website generation data obtained from the first CMS 510 to the second CMS 530. In response, the data model type migration agent 524 uses an API of the second CMS 530 to obtain or import the list of data model types used and available from the second CMS 530. The data model type migration agent 524 may use a mapping to identify the correspondence between a given data model type of the first CMS 510 that is referenced by the website generation data and the same given data model type of the second CMS 530. Once the data model type correspondence is determined, the data model type migration agent 524 detects differences between the currently stored local version of the data model types 527 and the imported or obtained data model types from the second CMS 530. The data model type migration agent 524 generates a script to update or change the data model types stored on the second CMS 530 based on the local version of the data model types 527. The data model type migration agent 524 uses a demo version to ensure that the changes are backwards compatible before committing those changes to the data model types stored on the second CMS 530. After successfully executing the demo version without errors, the data model type migration agent 524 updates the data model types stored on the second CMS 530 automatically and stores the website generation data to the second CMS 530. While data model type migration agent 524 is shown as being included in the software development tool 520, the data model type migration agent 524 can be implemented as a separate application that is in constant or periodic communication with the software development tool 520.

In some embodiments, the first CMS 510 stages production of the website generation data. For example, the first CMS 510 may store the website generation data in two places and with two versions, a preproduction stage and a production stage. The first stage may not be published or made available to access until the first stage transitions to the next production stage. The website generation data that is in the production stage is presented to users who access the website generation data. This way, changes can continuously be made to the website generation data that is in the first preproduction stage without immediately being presented to users. Once the changes are acceptable and ready for production, the production stage version of the website generation data is replaced with the preproduction stage version of the website generation data. This allows changes to be rolled back seamlessly and without interruption of the website to users.

Figure 7:
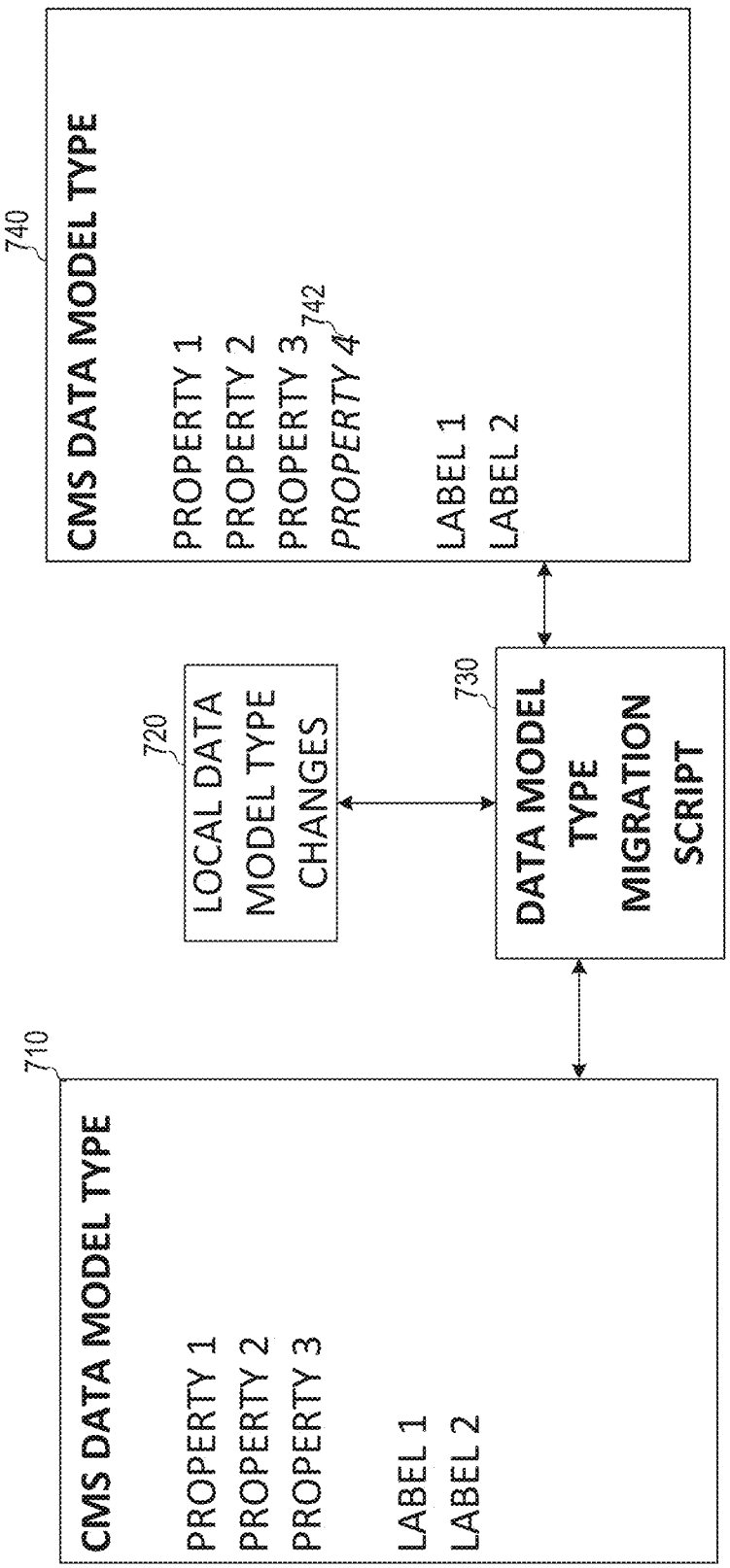
FIG. 7 is a diagrammatic representation of website data model type migration, in accordance with some examples.
Figure 8:
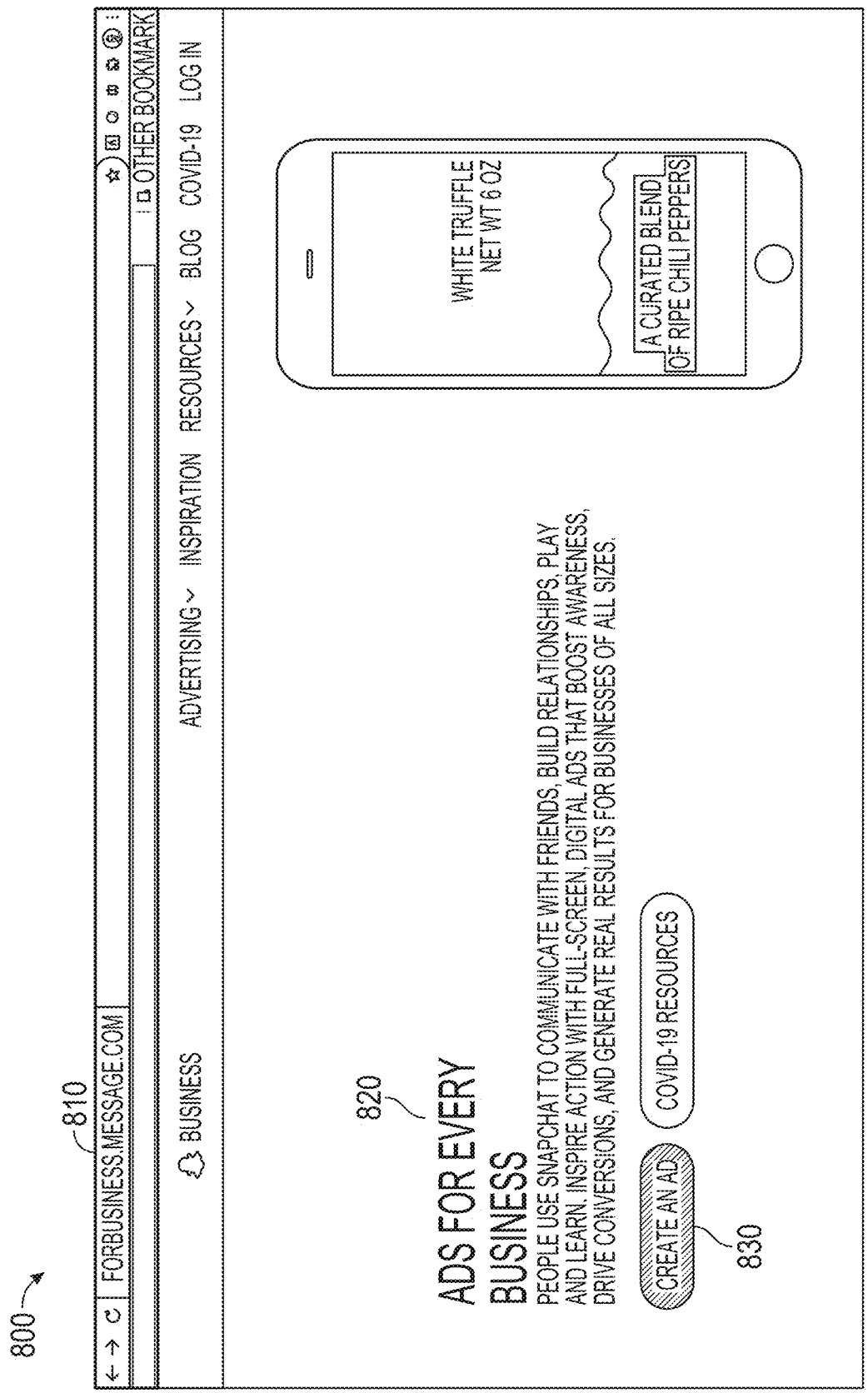
FIG. 8 is an illustrative website generated by the website generation system, in accordance with some examples.

FIG. 7 is a diagrammatic representation of website data model type migration, in accordance with some examples. For example, a CMS data model type 710 is stored on the CMS 107. The CMS data model type 710 includes a plurality of properties and a plurality of labels. The properties define the look and feel (behavior) of the data model type, such as a button. For example, as shown in FIG. 8, a webpage 800 is shown that is accessed at an address 810. The webpage is generated for display based on website generation data that references the CMS data model type 710. As shown, the look and feel of button 830 corresponding to the CMS data model type 710 has a first set of properties that do not include a color of the button 830.

The CMS data model type 710 is imported by the software development tool 103 (migration agent) and stored as a local version. A user or software developer of the software development tool 103 makes changes to the local version of the data model type and such changes are recorded and tracked by the local data model type changes 720. For example, the user adds a color property to the CMS data model type 710 that is local stored. These changes are provided to the data model type migration script 730. The data model type migration script 730 compares the changes received from the local data model type changes 720 to the CMS data model type 710 stored on the CMS 107. In response to detecting a difference, the data model type migration script 730 uses an API of the CMS 107 to apply (migrate) those changes to the CMS data model type 710 stored on the CMS 107.

As an example, the change that is identified is the addition of a new property to the CMS data model type 710. After applying or migrating those changes, the CMS data model type 740 that is stored on the CMS 107 is modified to include the new property 742. This updated CMS data model type 740 can be used and referenced by other website generation data that is stored on the CMS 107. For example, as shown in FIG. 9, a webpage 900 is shown that is accessed at an address 910. The webpage is generated for display based on website generation data that references the CMS data model type 740 with the new property 742 (e.g., the color of the button is added). As shown, the look and feel of button 920 corresponding to the CMS data model type 740 has a second set of properties that include a color of the button 920 which is different from the button 830 (FIG. 8).

Figure 10:
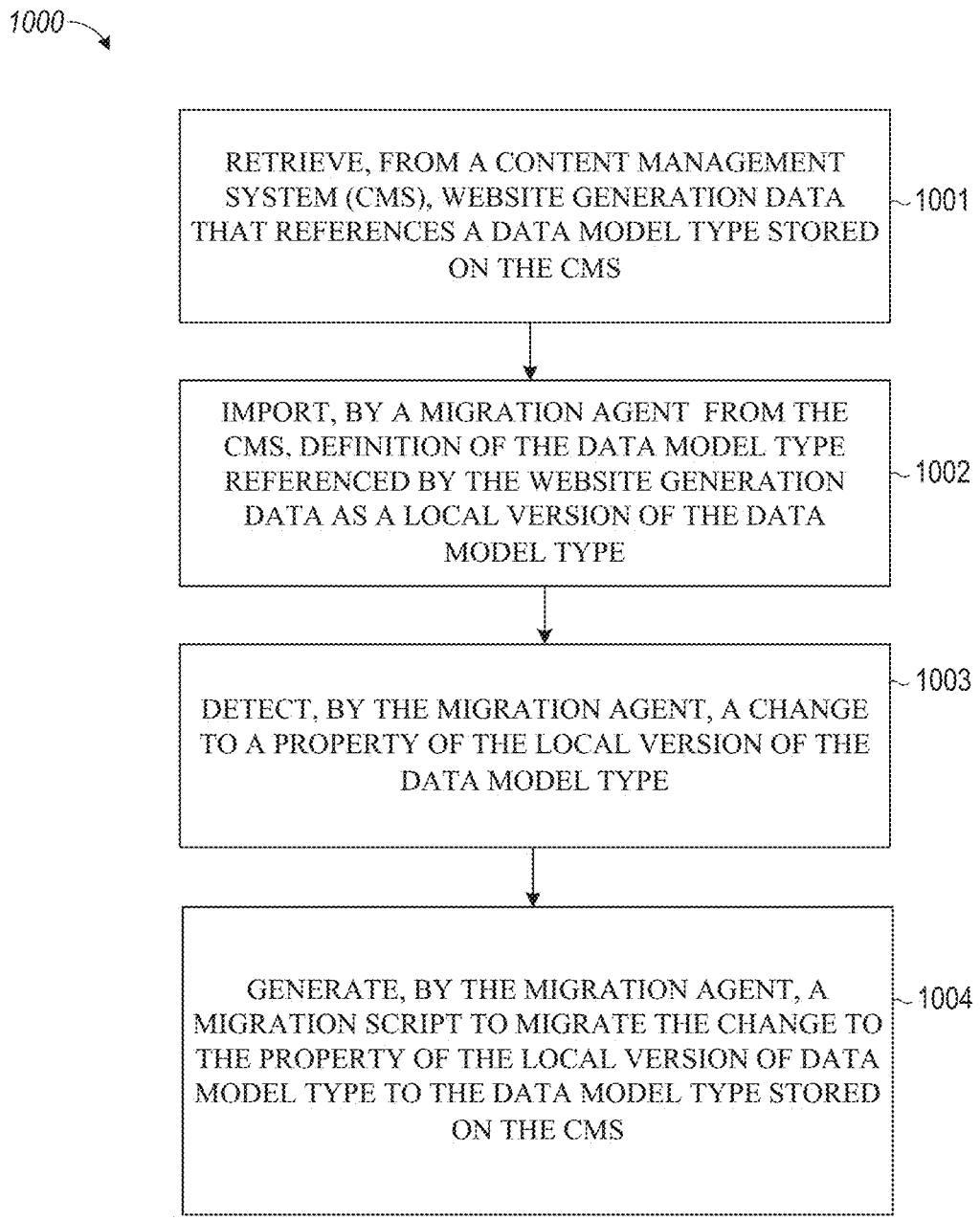
FIG. 10 is a flowchart illustrating example operations of the website generation system, according to example embodiments.

FIG. 10 is a flowchart illustrating example operations of the website generation system in performing a process 1000, according to example embodiments. The process 1000 may be embodied in computer-readable instructions for execution by one or more processors such that the operations of the process 1000 may be performed in part or in whole by the functional components of the software development tool 103; accordingly, the process 1000 is described below by way of example with reference thereto. However, in other embodiments at least some of the operations of the process 1000 may be deployed on various other hardware configurations, such as on application servers 112. The operations in the process 1000 can be performed in any order, in parallel, or may be entirely skipped and omitted At operation 1001, a client device 102 retrieves from a CMS website generation data that references a data model type stored on the CMS. For example, the software development tool 103 accesses the CMS 107 to retrieve website generation data, such as data stored in a preproduction stage. For example, the website generation data can include hypertext markup language with various elements (data model types), such as <audio>, <button>, <caption>, <code>, and so forth.

At operation 1002, the client device 102 imports, by a migration agent in communication with a software development tool from the CMS, definition of the data model type referenced by the website generation data as a local version of the data model type. For example, the data model type migration agent 524 uses an API of the CMS 107 to obtain the data model types that are all available from the CMS 107 or a subset that is used and referenced by the retrieved website generation data. Specifically, for a <button> data model type, the definition specifies attributes (properties)

(e.g., autofocus, form, formaction, formtarget, name, type, and so forth) and labels (specific names and non-behavioral elements).

At operation 1003, the client device 102 detects a change to a property of the local version of the data model type. For example, the migration generation server 128, data model type migration agent 524 or the software development tool 103 compares a local version of the obtained data model type to the version stored on the CMS 107 to detect any differences to the properties (rather than the labels) of the data model types. Specifically, for the <button> data model type, the CMS definition does not include a color attribute or property and the software development tool 103 version adds the color attribute or property to the <button> data model type. The migration generation server 128 is configured to disregard or ignore any hypertext markup language segment for a given data model type that is a label.

At operation 1004, the client device 102 (data model type migration agent 524) generates a migration script to migrate the change to the property of the local version of the data model type to the data model type stored on the CMS. For example, the data model type migration agent 524 generates a script to migrate or modify the version of the data model type stored on the CMS 107 based on the differences or changes to the properties of the local version of the data model types stored on the client device 102. In some cases, the changes are only migrated after running a successful demo version of the changes without errors. Specifically, the migration generation server 128 uses an API of the CMS to call certain functions for modifying properties or attributes of data model types. Using the specific function of the API, the migration generation server 128 automatically generates the code necessary for modifying the attributes of the data model type that has locally been changed.

Machine Architecture

Figure 11:
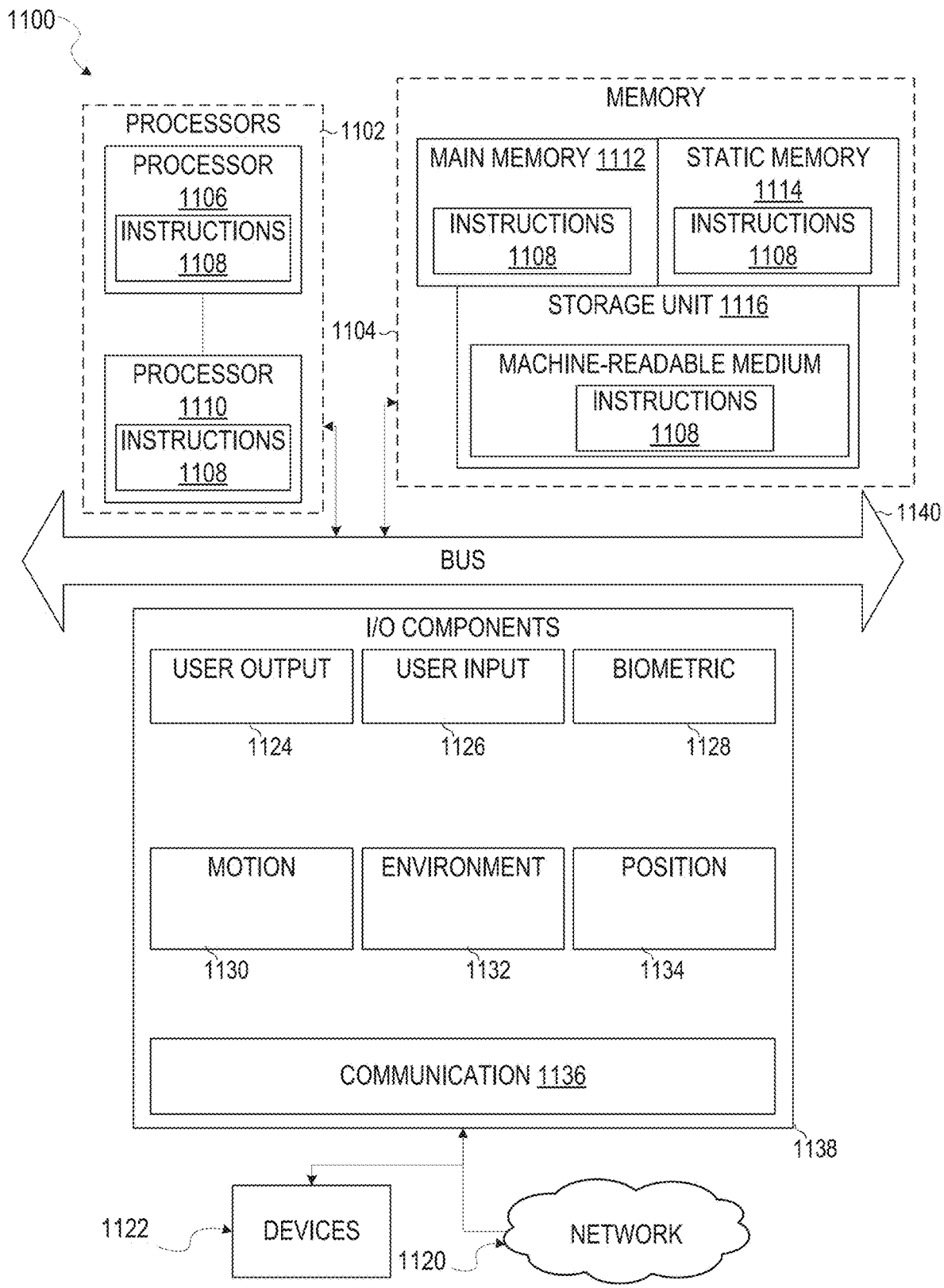
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
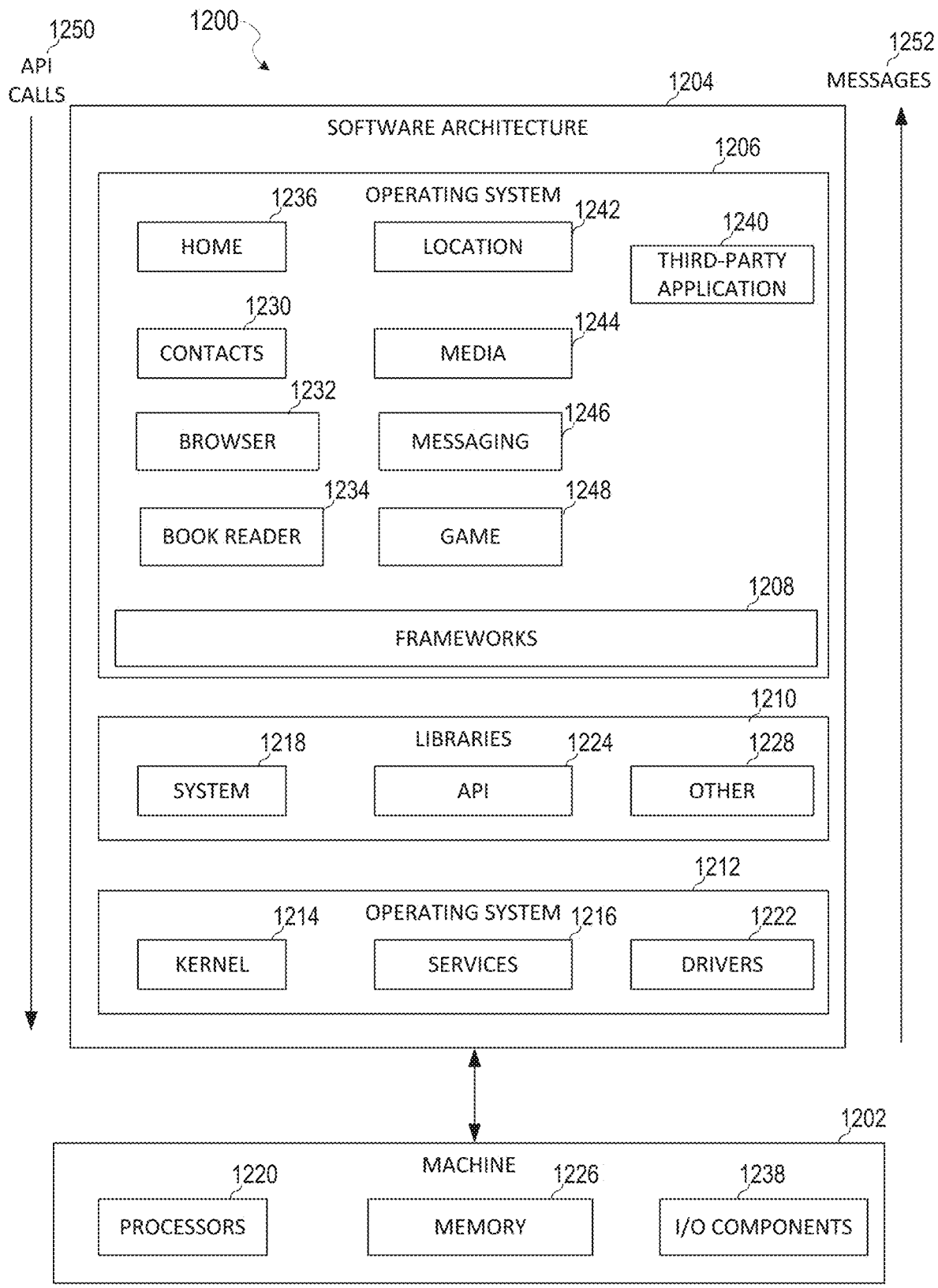
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors (e.g., processors 1102) or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
retrieving, from a content management system (CMS) by one or more processors, first website generation data that references a shared data model type stored on the CMS, the shared data model type also being referenced by second website generation data;
importing, by a migration agent in communication with a software development tool from the CMS, definition of the shared data model type referenced by the first website generation data as a local version of the data model type;
detecting, by the migration agent, a change to a property of the local version of the shared data model type;
generating, by the migration agent, a migration script to migrate the change to the property of the local version of data model type to the shared data model type stored on the CMS and modify the shared data model type; and
prior to implementing modification of the shared data model type to reflect the change to the property of the local version of the shared data model type, verifying that the second website generation data operates free of errors when the second website generation data accesses the modified shared data model type.

2. The method of claim 1, wherein the shared data model type comprises object source code, and wherein the migration agent continuously or periodically monitors for changes to properties of the local version of the shared data model type.

3. The method of claim 1, wherein the software development tool enables a user to undo the change to the shared data model type, further comprising:
after implementing the modification of the shared data model type stored on the CMS, receiving input that selects an undo operation; and
removing the change to the property of the local version of the shared data model type in response to receiving the input that selects the undo operation to enable access to a previous version of the shared data model type.

4. The method of claim 3, wherein the shared data model type stored on the CMS is shared by a plurality of websites, further comprising migrating the removal of the change to the property of the local version of the shared data model type to the shared data model type stored on the CMS.

5. The method of claim 1, further comprising:
applying, by the CMS, the migration script to a demo version of the shared data model type that includes the change to the property;
verifying, by the CMS, whether the demo version is backwards compatible with other website generation data; and modifying the shared data model type to include the change to the property in response to verifying that the demo version is backwards compatible.

6. The method of claim 5, further comprising:
notifying a user of the software development tool in response to verifying whether the demo version is backwards compatible; and
preventing the shared data model type stored on the CMS from being updated with the change to the property.

7. The method of claim 1, further comprising:
after updating the shared data model type stored on the CMS with a second change to a second property, receiving a request, by the software development tool, to undo the second change to the second property of the shared data model type;
modifying the local version of the shared data model type to undo the second change to the second property; and
generating, by the migration agent, another migration script to migrate the modification to the local version of the shared data model type, in which the second change is undone, to the shared data model type stored on the CMS.

8. The method of claim 1, wherein the migration script uses an application programming interface function of the CMS to modify the shared data model type stored on the CMS.

9. The method of claim 1, further comprising:
querying, by the migration agent, the CMS to obtain a plurality of data model types stored on the CMS;
identifying a given data model type of the plurality of data model types obtained from the CMS that corresponds to the shared data model type referenced by the first website generation data; and
comparing the shared data model type referenced by the first website generation data to the given data model type to detect the change to the property of the local version of the shared data model type.

10. The method of claim 1, wherein the CMS is a first CMS, further comprising:
querying, by the migration agent, a second CMS to obtain a plurality of data model types stored on the second CMS, the data model types stored on the second CMS differ from the data model types stored on the first CMS;
identifying a given data model type of the plurality of data model types obtained from the second CMS that corresponds to the shared data model type referenced by the first website generation data obtained from the first CMS;
comparing the shared data model type referenced by the first website generation data to the given data model type to detect a difference; and
generating, by the migration agent, a second migration script to migrate the difference to the given data model type stored on the second CMS.

11. The method of claim 10, wherein identifying the given data model type comprises storing a mapping between data model types of the first CMS with data model types of the second CMS.

12. The method of claim 1, further comprising:
staging deployment of the shared data model type stored on the CMS with the change, such that in a first stage the shared data model type without the change is stored and in a second stage the shared data model type with the change is stored.

13. The method of claim 12, wherein in the first stage of deployment, the shared data model type without the change is used to provide a website corresponding to the first website generation data, and after moving the shared data model type from the second stage to the first stage, the shared data model type with the change is used to provide the website corresponding to the first website generation data.

14. The method of claim 1, wherein the shared data model type comprises a first set of properties, and wherein the change to the property of the local version of the shared data model type comprises adding a new property to the first set of properties.

15. The method of claim 14, wherein the shared data model type comprises a button, and wherein the new property comprises a visual graphic.

16. The method of claim 1, wherein the shared data model type comprises a first set of properties, and wherein the change to the property of the local version of the shared data model type comprises modifying one of the first set of properties.

17. The method of claim 1, wherein the change to the property of the local version of the shared data model type comprises addition of a new property to the local version of the shared data model type, wherein the first website generation data uses the new property of the local version of the shared data model type, and wherein the second website generation data excludes use of the new property of the local version of the shared data model type, further comprising:
  determining that the second website generation data references the shared data model type without the new property, wherein the verifying that the second website generation data operates free of errors when the second website generation data accesses the modified shared data model type is performed in response to determining that the second website generation data references the shared data model type without the new property.

18. The method of claim 1, wherein the CMS is a first CMS, and wherein the shared data model type excludes color properties, further comprising storing the shared data model type on a second CMS with color properties in response to modifying the shared data model type.

19. A system comprising:
  a processor configured to perform operations comprising:
  retrieving, from a content management system (CMS), first website generation data that references a shared data model type stored on the CMS, the shared data model type also being referenced by second website generation data;
  importing, by a migration agent in communication with a software development tool from the CMS, definition of the shared data model type referenced by the first website generation data as a local version of the data model type;
  detecting, by the migration agent, a change to a property of the local version of the shared data model type;
  generating, by the migration agent, a migration script to migrate the change to the property of the local version of data model type to the shared data model type stored on the CMS and modify the shared data model type; and
  prior to implementing modification of the shared data model type to reflect the change to the property of the local version of the shared data model type, verifying that the second website generation data operates free of errors when the second website generation data accesses the modified shared data model type.

20. A non-transitory machine-readable storage medium that includes instructions that, when executed by one or more processors of a machine, cause the machine to perform operations comprising:
  retrieving, from a content management system (CMS), first website generation data that references a shared data model type stored on the CMS, the shared data model type also being referenced by second website generation data;
  importing, by a migration agent in communication with a software development tool from the CMS, definition of the shared data model type referenced by the first website generation data as a local version of the data model type;
  detecting, by the migration agent, a change to a property of the local version of the shared data model type;
  generating, by the migration agent, a migration script to migrate the change to the property of the local version of data model type to the shared data model type stored on the CMS and modify the shared data model type; and
  prior to implementing modification of the shared data model type to reflect the change to the property of the local version of the shared data model type, verifying that the second website generation data operates free of errors when the second website generation data accesses the modified shared data model type.

* * * * *